July 12, 1932.  G. MÜLLER ET AL  1,867,418
APPARATUS FOR FEEDING WIRES
Filed April 20, 1931  3 Sheets-Sheet 1
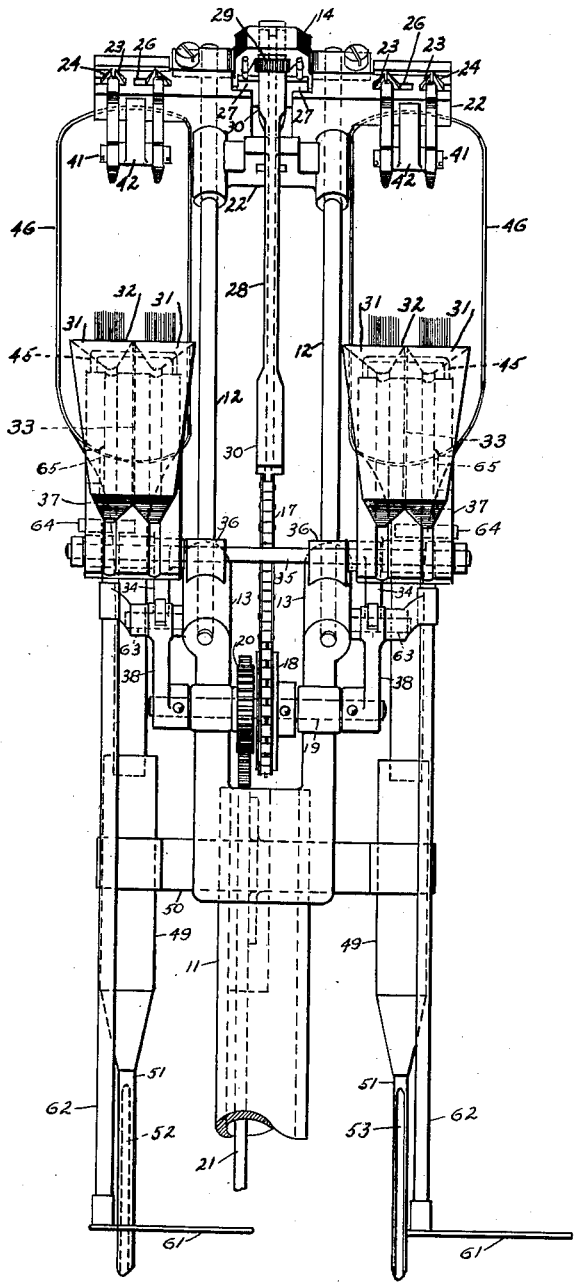
INVENTORS
GUSTAV MÜLLER
CURT WEINMANN
BY Charles E. Mullen
THEIR ATTORNEY

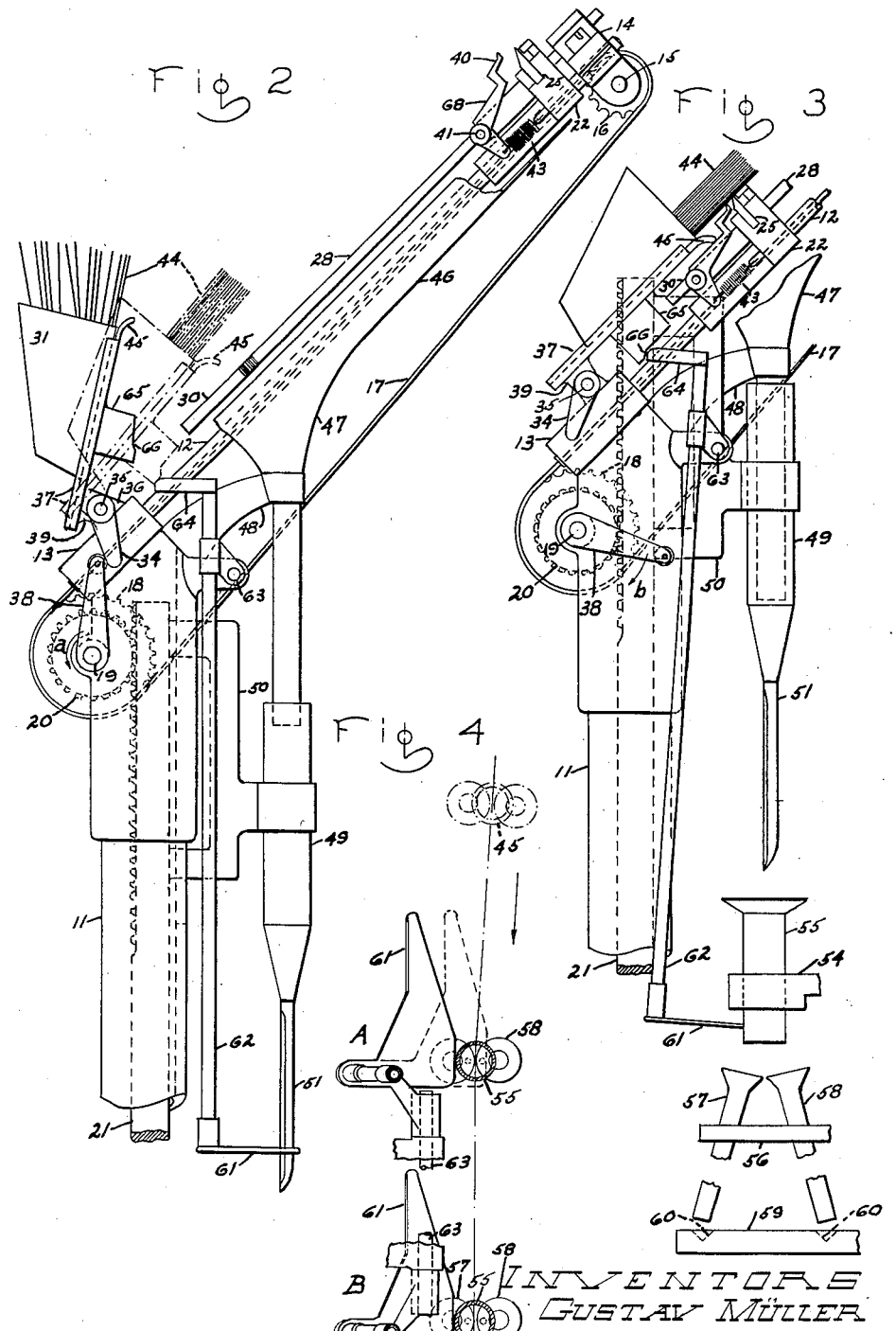

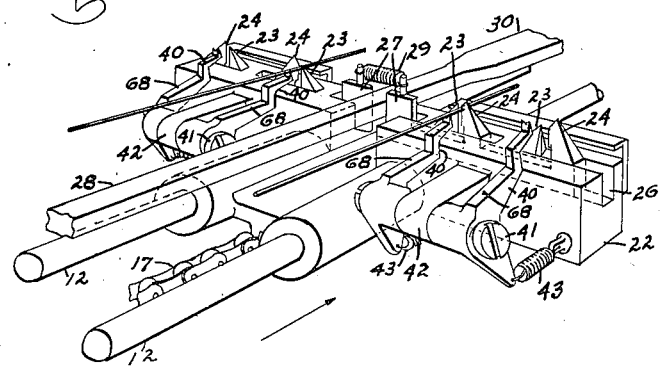
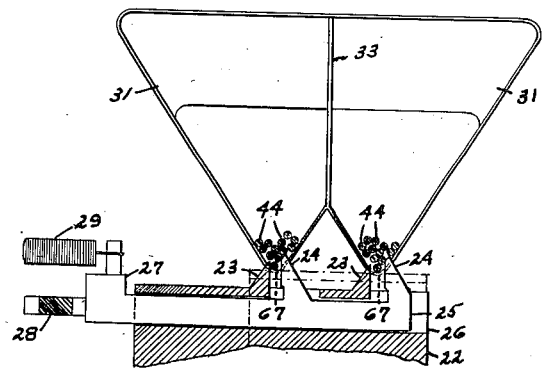

Patented July 12, 1932

1,867,418

UNITED STATES PATENT OFFICE

GUSTAV MÜLLER, OF BERLIN-STEGLITZ, AND CURT WEINMANN, OF BERLIN-CHARLOTTENBURG, GERMANY, ASSIGNORS TO GENERAL ELECTRIC COMPANY, A CORPORATION OF NEW YORK

APPARATUS FOR FEEDING WIRES

Application filed April 20, 1931, Serial No. 531,301, and in Germany May 2, 1930.

Our invention relates to apparatus for feeding wires and more particularly to apparatus for feeding wires to stems for incandescent lamps and similar articles, said stems being carried by a stem making machine. One of the distinguishing features of our invention is the provision of two or more pairs of jaws for each hopper or other holder for the wires. The arrangement is such that the jaws of the respective pairs are spaced apart varying distances, and the pairs are so connected that when the pair whose jaws are set closest together has seized a wire, the wider spaced pair does not operate, but if the close set pair does not seize a wire, the other pair does. Various other features and advantages of our invention will appear form the following description of a species thereof and from the accompanying drawings.

In the drawings, Fig. 1 is a vertical elevation; Figs. 2 and 3 are side elevations in which the parts have different positions; Fig. 4 is a plan view of the cooperation of two cams of the device with the stems of electric incandescent lamps which are to be supplied with wires; Fig. 5 is a detailed view in perspective of the gripping clamps; and Fig. 6 is a view showing the gripping of individual wires by a gripping clamp.

Referring to Figs. 1 and 2, two inclined bars 12 are solidly connected in sleeves 13 to a tubular frame 11. The top ends of these bars 12 are held in a cross piece 14 in which the shaft 15 of the sprocket 16 bears. The latter is connected by chain 17 to sprocket 18, the shaft 19 of which bears in the frame 11. The teeth of gear 20, which is also located on shaft 19, mesh with the teeth of the rack bar 21 located in frame 11, so that an up or down movement of bar 21 causes movement of chain 17 in alternately opposite directions. A slider 22, which slides on bars 12, is fastened to chain 17 so that an upward movement of the bar 21 causes the slider 22 to move down and a downward movement of the bar 21 causes slider 22 to move up. The gripping clamps, located in slider 22 (Figs. 5 and 6) each consist of two jaws 23 solidly connected to slider 22 and two movable jaws 24 provided on bar 25 which is guided in a lateral slot 26 of the slider 22. The distance between the gripping edges of the jaws 24 is somewhat greater than the distance between jaws 23 so that the space between the two jaws comprising the outer half of the clamp is always somewhat larger than the space between the jaws of the inner half. The ends of the bars 25 facing each other have ear-shaped extensions 27 which are held against a stationary bar 28 by the action of a spring 29 which connects them. The ends 30 of the bar 28, which is held in the cross piece 14, are widened. During the movement of the slider 22, the extensions 27 of the bars 25 bear against the bar 28 causing the jaws 23—24 to be in a closed position during the motion of the slider, opening only when opposite the widened ends 30.

In the lower position of the slider 22 (Fig. 3) the gripping clamps are held in a position by the ends 30 of the bar 28 so that there is room for only one single wire between the jaws 23—24 comprising either half of the clamp. In the upper position of the slider 22 (Fig. 2) the gripping clamps are opened by the action of the top part 30 of the bar 28 to such an extent that a gripped wire drops out easily.

Each wire container has a number of compartments 31 corresponding to the number of pairs of jaws of the particular gripping clamp, two in this instance. These compartments are open only at the front side 32, that is, in the direction of the slides 22. In the drawings, Fig. 6, each wire container is shown divided into two equal spaces by a vertical wall 33, the spaces being funnel-shaped with the narrow opening at the bottom. Arms 34 are fastened to shaft 35 which bears in the eyes 36 on the sleeves 13, said arms being located below the container base plate 37 and acting in conjunction with arms 38 fastened to shaft 19. Arms 38 acting on arms 34 cause the wire containers to assume the position shown in Fig. 1. However as soon as the arms 38 move to the left, as shown by arrow a, the containers 31 which are connected through the base plates 37 and lugs 39 to shaft 35, move downward due to the action of their weight.

Releasing fingers 40 (Fig. 5) pivot on cross bolts 41 which bear in lugs 42 on the slider 22, and are located centrally with and preceding the jaws. Due to the action of the springs 43 which connect the lower end of the fingers 40 with the slide 22 the forward ends of the fingers have a tendency to move upward so that the tips of the fingers, which are notched to receive a wire 44, project over the jaws of the gripper. In the lower position of the slide 22, as shown in Fig. 3, the fingers 40 are pressed down by the containers which are in the down position. This is accomplished by means of bent channels 45 which protrude from the front edges of the base plates 37.

Below the trajectory of the two gripping clamps there are two receivers 46 of two funnels 47 which are tube shaped and which are held stationary in arms 48 of frame 11. The tube shaped ends of the funnels 47 are enclosed by tubes 49 which are fastened to a bow-shaped addition 50 of the rack bar 21 and which consequently move up and down with that bar. The tubes 49 end at their lower in small tubes 51 which are provided with slots 52 and 53 (Fig. 1), placed 180° apart, which serve to guide the current supply wire 44 which drops down in the tubes 49 and 51.

The funnels 47 and the tubes 49 and 51 end up above the wire receiving positions of two holding heads of a stem making machine which in the usual manner has an interrupted rotary motion. The heads have, in the known manner, a clamp 54 (Fig. 3) which holds a stem tube 55, a holder 56 for two guide tubes 57 and 58 which form an angle with each other and a supporting plate 59 which has indentations 60, into which the lower ends of the current supply wires enter. The projections 61 of two bars 62 project into the trajectory of the stem tube 55; the bars being suspended so that they can swing on the shaft 63 bearing in frame 11. The bars 62 which usually assume a vertical position due to the action of their weight, have on their upper ends also projections 64 which act in conjunction with the stops 65 located at the bottom of the wire container or of the plates 37. The bars and their projections 61 and 64 serve to insure the proper gripping of the current supply wire and also to avoid unnecessarily delivering a wire when the stem tube is lacking.

The operation of the new wire-separating and removing device is as follows:

The rack bar 21 moves up and the tubes 51 are pulled out of the stem tubes 55 of the stem making machine. The chain 17 is moved by the upward motion of the bar 21, and the slide 22 with the two gripping clamps is moved down toward the wire containers. At the same time, the arms 38 rotate to the left in the direction of the arrow 'a' (Fig. 2) with the result that the wire containers drop downwardly due to the action of their own weight. As the bars 62, however, are still in the vertical position shown in Fig. 2, the wire containers are arrested before completion of the drop by the cams 64, this position being indicated in Fig. 2 by the dot-dash lines. The slide 22 can, then, complete its downward motion without interruptions before the wire containers assume the final down position. The slide 22 then arrives with its two gripping clamps a short distance in front of the open sides of the wire containers and stops directly below the ends of the wires 44 which project from the containers. In this lowest position of the slide, the extensions 27 of the sliding bars 25 which carry the movable jaws 24 run onto the lower enlarged part 30 of the control bar 28, opening the pairs of jaws 23, 24 of the two gripping clamps and thereby placing them in readiness for gripping wires. The stem making machine then acts to bring two new heads in position below the raised tubes 51. If these heads are properly provided with stem tubes 55 the cams 61 of the bars 62 are pressed backwards by said tubes and cams 64 are moved to the right due to the swing of bar 62, as shown in Fig. 3. The wire containers are then freed from projections 64 and can consequently complete their downward movement due to the action of their weight. The wire containers are supported in this down position by projections 64 which engage with shoulders 66 of the stops 65. During this downward motion of the wire containers the fingers 40 are pressed down by means of channels 45 and, also, the free ends of the current-supply wires 44 located in the grooved parts 67 (Fig. 6) of the wire containers, are placed above the opened pairs of jaws 23, 24 of the gripping clamps. The pairs of jaws 23, 24 each separate one of the number of wires 44 located between and above them as their openings are just large enough to admit one single wire. The bar 21 is now moved downward and, in conjunction therewith, the slide 22 is moved upward. The wire container remains, during the greater part of the upward movement of the slide, in its lower position as the arms 38 touch the arms 34 only after a large degree of rotation. Shortly after the slide 22 starts its upward motion the extensions 27 of the bars 25 slide onto the thinner part of the control bar, closing the pairs of jaws 23, 24. If a wire is located between the inner pair of jaws it is solidly clamped by them. The outer pair of jaws with the larger opening are stopped in their movement toward each other at the moment the wire is clamped in the first pair of jaws, and as they do not close sufficiently far, they can not grip a wire. If, on the other hand, the first pair of jaws has not gripped a wire, the second pair can continue to close and grip a wire. Consequently, only one or the other pair of jaws operate. During the clamping of the wire, the fingers 40 are still in the downward position as the channels 45 slide on an extended back surface 68 of the fingers 40 when the upward motion of the slide begins. When the channels slide off the fingers 40, these fingers cannot tilt up under the action of springs 43 due to the fact that the clamped-in wires 44 hold them down. Further upward travel of slide 22 causes the removal of the clamped wires from the containers. During the upward travel of the slide, the fingers press up against the clamped wires 44 due to the action of springs 43. As soon as the slide reaches the top end position, the jaws 23, 24 are again opened as the extensions 27 run onto the top enlarged part 30 of the bar 28. The fingers 40 snap upward due to the pull of springs 43, lifting the wires 44 located above them out of the opened pairs of jaws, and throwing them into receivers 46 located under slide 22. From this receiver 46, the current supply wires 44 slide into the funnels 47 and into the tubes 49 which, in the meantime, have moved downward with the bar 21 and their constricted parts 51 have penetrated into the stem tubes 55. The wire 44 which drops off in the operating position A (Fig. 4) slides through the slot 52 (Fig. 1) into the tube 57 and the wire which drops off in the operating position B moves through the slot 53 into the second tube 58 of the holding head. As each holding head of the stem making machine passes through both operating positions A and B, current supply wires are introduced into both tubes 57 and 58 and placed for insertion into the indentations 60 of the supporting plate 59. Shortly before the slider reaches its final upper position, the wire containers 31 are again moved into the high position shown in Fig. 2 as the arms 38 moving in the direction of arrow $b$ (Fig. 3) strike against arms 34. Since the raising of the containers takes place comparatively rapidly, all current supply wires are thoroughly shaken and loosened. This prevents sticking of the wires in the compartments of the container which narrow down in the shape of a funnel. If, for some reason, a head of the stem making machine were not provided with a stem tube 55, the bars 62 would not swing out in either operating position A or B. As the wire containers in that case do not move down completely, no wires are brought within the range of the clamps, which then return empty to the initial position.

What we claim as new and desire to secure by Letters Patent of the United States is:

1. In an apparatus for transferring wires, the combination of a container adapted to support a number of wires with their ends projecting therefrom and a wire clamping means mounted for movement toward and away from said container to grip a wire at its projecting end and to remove it from said container, comprising a plurality of jaws and means for causing a simultaneous closing movement thereof after said clamping means reaches a position adjacent said wire ends, said jaws and closing means being so proportioned and arranged that one pair of said jaws closes faster than the other so that the second pair is rendered inoperative if the first pair grips a wire and becomes operative if said first pair fails to grip a wire.

2. In an apparatus for transferring wires, the combination of a container for a supply of said wires and a wire clamping means movable relative to each other, said wire clamping means comprising a plurality of pairs of jaws, each pair comprising a stationary jaw and a movable jaw acting in conjunction with said stationary jaw, said movable jaws being so coupled that they are actuated simultaneously and the distance between them being greater than that between said stationary jaws.

3. In a device of the character described, the combination of a container for wires, a slider, means for moving the latter to and from said container, gripping clamps carried by said slider comprising movable jaws having extensions carried by said slider and means for displacing said jaws laterally comprising a stationary control bar having an enlarged end disposed opposite to said container and spring devices for holding said jaw extensions against said control bar.

4. In a device of the character described, the combination of a container for wires mounted to allow rotation about a horizontal axis and comprising a plurality of compartments having funnel shaped bottoms, a plurality of gripping clamps movable with respect to said container each corresponding to one of said compartments and each comprising a pair of jaws and means for positioning said container in its downward movement so that the lowest wire carried in each compartment is gripped by the jaws of a clamp as the latter moves into position adjacent to said compartment.

5. In a device of the character described, the combination of a wire container mounted to allow rotation thereof about a horizontal axis, a shaft, means for oscillating said shaft, a slider comprising gripping clamps, means comprising a chain and sprocket mounted on said shaft for moving said slider and means whereby the oscillation of said shaft causes said container to move up and down.

6. In a device of the character described, the combination of a wire container mounted to allow rotation up and down about a horizontal axis, a slider and means for moving the same to and from said container, a stationary receiver mounted below said slider, gripping clamps carried by said slider and comprising pairs of jaws and spring controlled fingers mounted so that they are depressed by contacting with said container and are released thereafter as the slider moves from said container to throw a released wire into said receiver.

7. In a device of the character described, the combination of a movable carrier comprising a stem holder, a wire container rotatably mounted adjacent said carrier, means for intermittently rotating said container to and from a discharge position and means for preventing said container from reaching said discharge position in the absence of a stem in said holder comprising a bar movably supported and carrying means positioned to be engaged by a stem to move said bar and to cause other means carried thereby to engage said container.

8. In a device of the character described, the combination of a movable carrier comprising a stem holder, a wire container rotatably mounted adjacent said carrier, means for intermittently rotating said container to and from a discharge position and means for preventing said container from reaching said discharge position in the absence of a stem in said holder comprising a bar movably supported and carrying a projection positioned to be engaged by a stem to move said bar and to cause another projection carried thereby to engage said container.

9. In a device of the character described, the combination of a movable carrier comprising a stem holder, a wire container rotatably mounted adjacent said carrier, means for intermittently rotating said container to and from a discharge position and means for preventing said container from reaching said discharge position in the absence of a stem in said holder comprising a bar pivotally supported and carrying a projection positioned to be engaged by a stem to swing said bar and to cause another projection carried thereby to engage said container.

In witness whereof we have hereunto set our hands.

GUSTAV MÜLLER.
CURT WEINMANN.